United States Patent [19]

Spence

[11] Patent Number: 4,739,333
[45] Date of Patent: Apr. 19, 1988

[54] SINGLE CHANNEL DISTANCE MEASURING RECEIVER SYSTEM AND METHOD

[76] Inventor: Lewis C. Spence, 3084 NW. 74th Ter., Okeechobee, Fla. 33472

[21] Appl. No.: 836,495

[22] Filed: Mar. 5, 1986

[51] Int. Cl.$^4$ .............................................. G01S 1/34
[52] U.S. Cl. ..................................................... 342/394
[58] Field of Search ............... 342/387, 389, 394, 396, 342/397, 458; 364/452

[56] References Cited

U.S. PATENT DOCUMENTS

| | | | |
|---|---|---|---|
| 3,171,127 | 2/1965 | Asteraki et al. | 342/458 |
| 3,689,925 | 9/1972 | Hulland | 342/396 |
| 3,747,106 | 7/1973 | Dalabakis et al. | 342/458 |

Primary Examiner—Theodore M. Blum
Assistant Examiner—Gilberto Barrón, Jr.
Attorney, Agent, or Firm—Saidman, Sterne, Kessler & Goldstein

[57] ABSTRACT

A distance-measuring receiver and system uses a transmitter which transmits only a single continuous-wave signal. The receiver produces a first component and a second component from the received signal. The first component is frequency doubled and used to produce a signal indicative of the beginning of a measurement window. The second component is used to produce a signal indicative of the end of the measurement window. The size of the measurement window can be used to produce a real time indication of the position of the receiver form the transmitter.

13 Claims, 2 Drawing Sheets

SINGLE CHANNEL DISTANCE MEASURING RECEIVER SYSTEM AND METHOD

BACKGROUND OF THE INVENTION

1. Field of the Invention

This invention relates to the field of distance measuring receivers. More particularly, this invention relates to a distance measuring receiver which requires a single signal to be transmitted from a fixed location.

2. Related Art

It would be desirable for many reasons to provide an extremely accurate positioning system, specifically one for use in nautical navigation and mapping. It will be appreciated that the location of such things as oil exploration and drilling rigs is extremely critical since an error on the order of meters can have a devastating effect on the success or failure of a particular exploration. Similarly, for navigational purposes, extremely accurate positioning determination of the location of receivers from a remote transmitter is desirable.

The related art includes a number of systems which propose to provide position measurement information by measurement of the phase difference between two continuous wave signals. In U.S. Pat. No. 4,283,726, entitled "Dual Frequency Distance Measuring System and Method," to Spence shows a novel transmitter for a dual signal distance and position measuring system, which patent is incorporated by reference herein. In the conventional two signal system, two continuous wave signals precisely displaced in frequency are transmitted from a fixed transmitting station to a mobile receiving station.

At the receiving station, the two received signals are mixed together to produce a difference frequency or delta signal having a frequency equal to the frequency displacement, which defines the length of a "coarse" lane in which the receiver is located. The phase of the delta frequency signal is compared to the phase of a reference signal generated at the receiver. The frequency of the reference signal is the same as the delta signal, and the phase is identical to the phase of the reference signal generated by a source at the transmitting station used to produce the transmitted pair of signals. The difference between the phase of the delta signal and the phase of the reference signal generated at the receiver is indicative of the relative position of the receiver in the coarse lane.

The position of the receiver within a "fine" lane is determined by comparing the phase of one of the received signals with the phase of a signal of the same frequency generated by the source at the receiver. Under normal operating conditions, however, it is impossible to accurately determine the fine lane in which the receiver is located because the resolution of the coarse lane phase comparision is not high enough.

The applicant, in a subsequent invention disclosed in U.S. patent application Ser. No. 543,602, entitled "Distance Measuring Receiver System and Method," incorporated by reference herein, invented a dual signal receiver which creates in real time lanes of intermediate length between the coarse and fine lanes. These intermediate lanes are created from the two received signals by frequency multiplying them in linear expansion amplifiers which exhibit phase integrity. The resolution of the phase comparison in each of these intermediate lanes is relatively the same as that obtained for the fine and coarse lane measurements. However, the different lengths of the intermediate lanes allows this receiver to zero in on the fine lane in which the receiver is located.

The applicant has also recently invented a constant number frequency generator which may be used to replace the atomic clocks required by the conventional distance measuring systems. This invention is described in U.S. patent application Ser. No. 835,295, entitled "Constant Frequency Signal Generator Circuit and Method," filed on Mar. 3, 1986 U.S. Pat. No. 4,692,715 which application is incorporated herein by reference.

OBJECTS OF THE INVENTION

It is therefore an object of the present invention to provide an improved distance measuring receiver and system requiring only a single carrier or continuous wave signal to be transmitted.

It is another object of the present invention to provide a receiver which does not require a stable frequency source.

It is a further object of the present invention to provide a single channel receiver which produces a real time measurement window indicative of the position of the receiver with respect to the position of the transmitter.

It is another object of the present invention to provide a single channel receiver which provides a measurement indication of high resolution.

It is a further object of the present invention to provide a single channel receiver having excellent short and long term stability.

It is another object of the present invention to provide a measurement window of selected measurement increments. These and other objects are achieved by the present invention as described below.

SUMMARY OF THE INVENTION

The present invention is a receiver for receiving a single continuous wave or carrier signal from a transmitter.

This single signal is processed by the present invention in a manner to create two components: a first component and a second component. The first component is the original received signal multiplied by two, and retaining only the phase components of the originally received signal. The second component is the received signal minus the local oscillator signal. This second component therefore contains the phase information of both frequencies: the received signal and the local oscillator signal used for the frequency translation. The phase error introduced by the local oscillator signal is removed as described below.

The first component (signal 2f) is supplied to a first loop which translates the phase information down to a signal which defines the beginning of a measurement window. Specifically, a first loop oscillator generates a signal of frequency $2f'$, which is offset from the frequency of the first component $2f$ by a value $2f'/n$. The first loop oscillator signal $2f'$ is mixed with the first component $2f$, and the difference signal $2f'-2f$ is supplied to a comparator. The first loop oscillator signal $2f'$ is also divided by n to produce a signal of $2f'/n$, which is supplied to the comparator. Consequently, $2f'-2f=2f'/n$, which signal is supplied as a control signal to the first loop oscillator. Note that any phase error introduced by the first loop oscillator is cancelled. The signal of $2f'/n$ is indicative of the summation of n cycles of the first component. As stated above, it is used to define the beginning of a measurement window.

The second component $f - f_1$ is supplied to a second loop which translates the phase information to a signal which defines the ending of the measurement window. The lower frequency of the second loop means that the phase information increments faster than the phase information of the first loop as the receiver moves relative to the transmitter. Specifically, a second loop oscillator generates a signal of frequency k, which is offset from the frequency of the second component $f - f_1$ by a value of k/m. The second loop oscillator signal k is mixed with the second component $f - f_1$, and the difference signal $f - f_1 - k$ is supplied to a comparator. The second loop oscillator signal k is also divided by m to produce a signal of k/m, which is supplied to the comparator. Consequently, $f - f_1 - k = k/m$, which is supplied as a control signal to the second loop oscillator. Note that any phase error introduced by the second loop oscillator is cancelled. The signal of k/m is indicative of the summation of m cycles of the second component. As stated above, it is used to define the ending of the measurement window.

The phase component introduced by the $f_1$ signal generated by a local oscillator is unwanted and is removed from the measurement window as following. With respect to the first component, this unwanted phase is removed by the second mixer which translates the first component back to frequency f prior to the frequency doubling. With respect to the second component, the unwanted phase is effectively removed by a harmonic generator which provides the chosen measurement units (for example, meters, feet, centimeters, inches, etc.) to the measurement window. The frequency of the harmonic generator is controlled by the second loop oscillator. The unwanted phase causes a corresponding change in the k/m signal and the output of the harmonic generator, which together effectively cancel out the unwanted phase.

The phase jitter of the measurement window is extremely low. This is due to the synchronous phase relationship between the k/m signal (defining the measurement window ending) and the harmonic generator defining the measurement increments. Another reason is that all oscillator signals that are used are slaved to the component being measured. The only signal component in the receiver that is allowed to move relative to the count generators in the two loops is the received signal f.

The error produced by a transmitter that is slightly displaced from the desired frequency f has a relatively minor effect on the performance of the system. For example, assume an operational frequency f of 1500 kHz. Assume further that the transmitter has deviated from this frequency by 0.25 Hz. (Note that almost any conventional crystal oscillator can meet this tolerance). At a distance of 1500 wavelengths (each of which is 200 meters in length), which represents 300 km, the error caused by the transmitter deviation is under 4 centimeters total.

The measurement window provides the user with real time indication of the distance of the transmitter from the receiver. The outstanding resolution produced by the present invention is due to the cancellation of unwanted error components present in the signal processing.

BRIEF DESCRIPTION OF THE DRAWINGS

The invention will be better understood if reference is made to the accompanying drawings in which.

DESCRIPTION OF THE PREFERRED EMBODIMENTS

Figure 1:
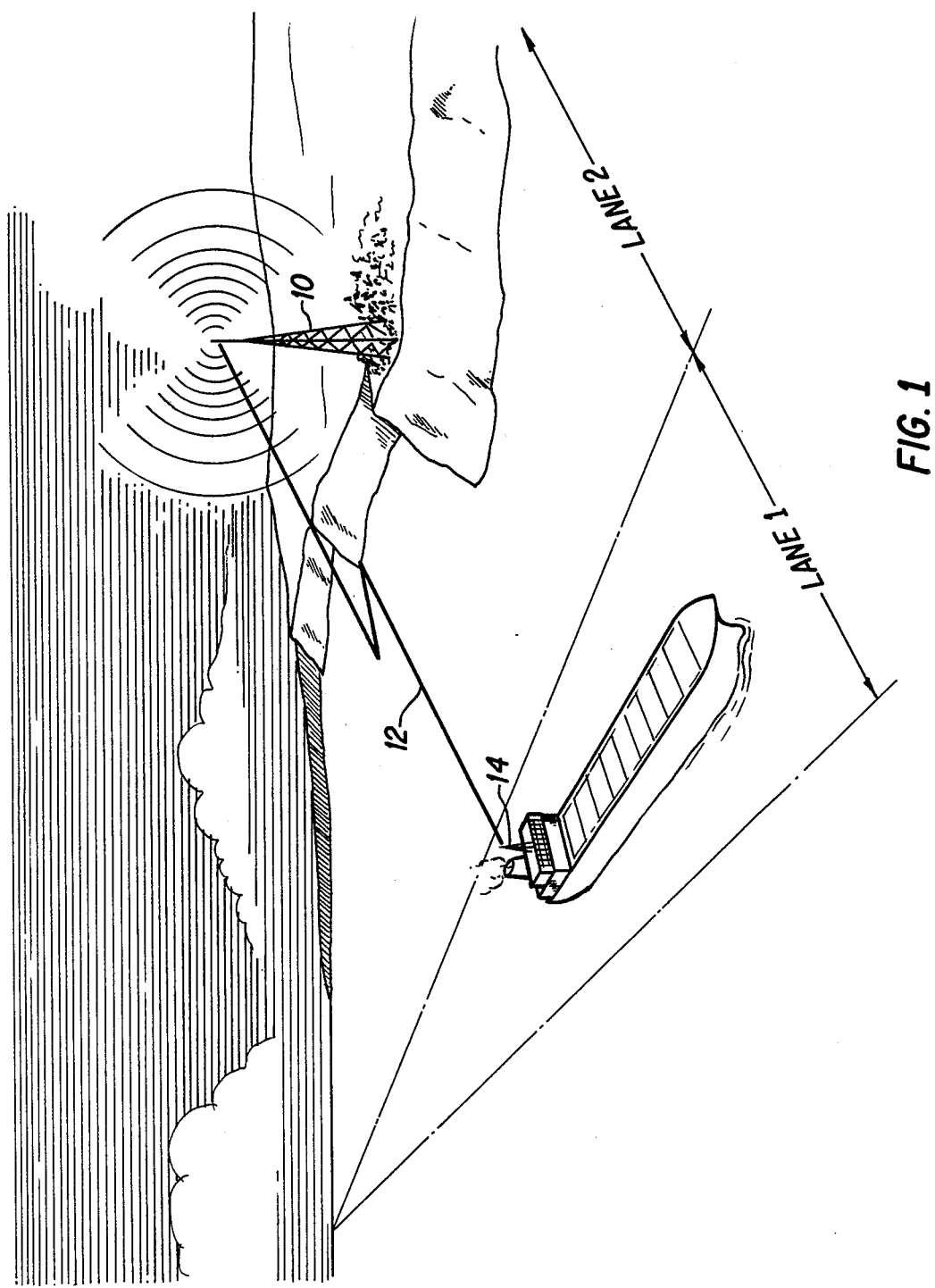
FIG. 1 shows an perspective view of the system using the single channel receiver of the present invention.

As discussed above, the present invention relates to a receiver and method for measuring the distance between a mobile receiver 14 and a stationary transmitter 10 transmitting a single continuous wave signal 12 as shown in perspective form in FIG. 1.

Figure 2:
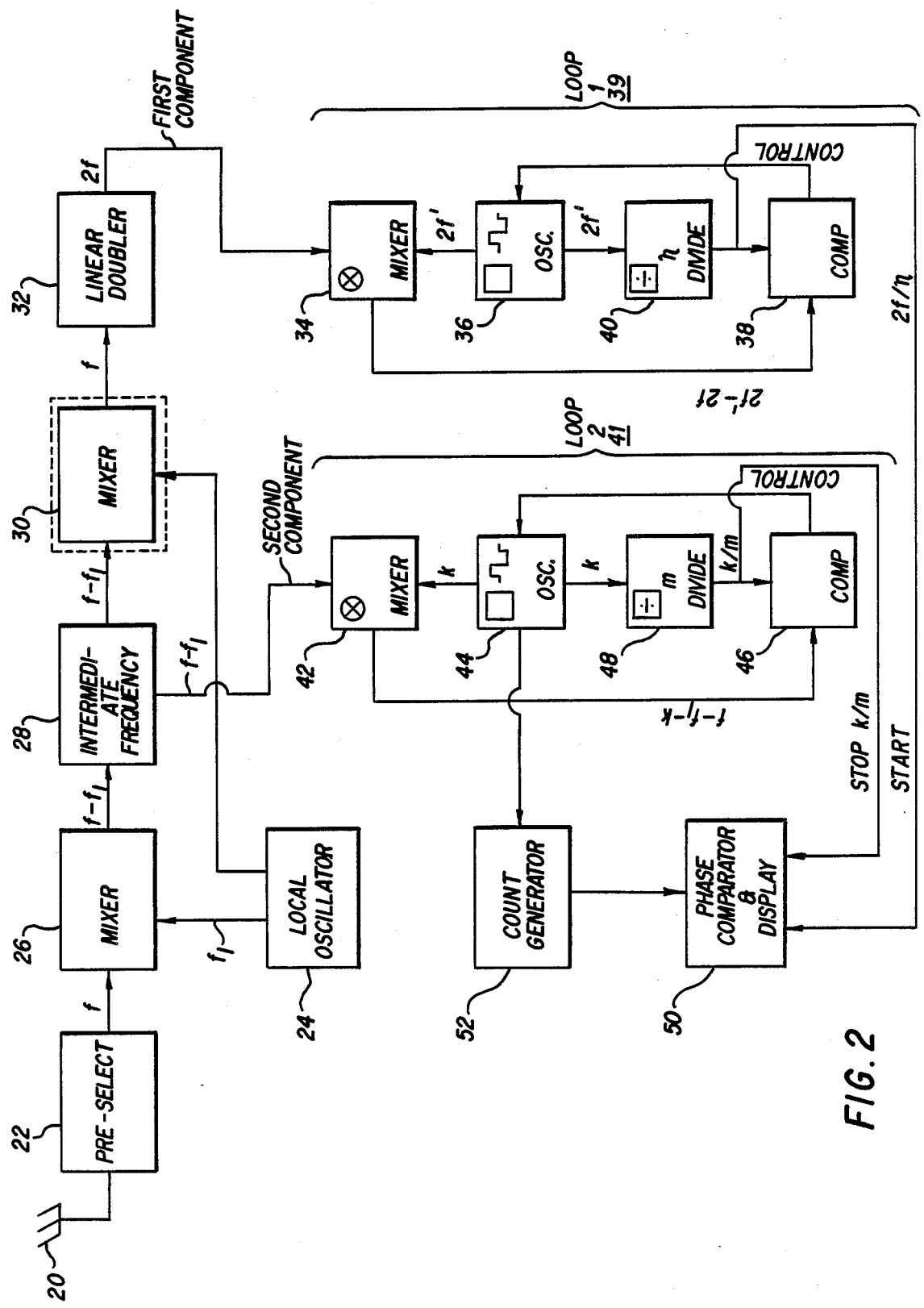
FIG. 2 is a block diagram of the receiver according to the present invention.

Referring now to FIG. 2, a block diagram of a representative embodiment of the present invention is shown. The single channel receiver of the present invention includes a preselector 22, first mixer 26, intermediate frequency system 28, a second mixer 30, a linear expansion amplifier 32, a first local oscillator 24 for generation of intermediate frequency using mixer 26 and also responsive to second mixer 30 to return the first component to its former first signal phase, a first phase loop system 39 for translating the receiver signal phase to a 1 kHz time base, a second phase loop system 41 for translating the intermediate frequency phase to a 1. kHz time base, an increment generator 52 responsive to the second phase loop system 41 for removing unknown components of phase from the resultant distance display 50, and a display system/final position indicator including a phase comparator 50.

For purposes of illustration, a mathematical relationship has been used which would not be the best choice if the present invention was migrated to the hardware level. However, for mathematical clarity, this selected relationship will make the intermediate frequency one half of the received signal, which simplifies the mathematics considerably.

Assume the received carrier signal f is 1600 kHz. The desired intermediate frequency $f - f_1$ will be 800 kHz. As a result, local oscillator 24 signal $f_1$ must be 800 KHz.

This receiver of the present invention utilizes several novel approaches to measurement of distance which will eliminate a number of uncertainties from the measurement. The first of these novel approaches is to lock up the frequency of the oscillator in one of the phase lock loops 39, 41 to the phase of the input signal. With reference to first phase lock loop 39, this means locking up the frequency signal or first component 2f with the phase of signal 2f by selecting a value of n such that $2f' - 2f = 2f'/n$. This in effect takes an undistinguishable input signal or first component 2f and puts "absolute markers" at intervals specified by n.

This receiver of the present invention also makes use of the phenomena that when a transmission is propagated, its electromagnetic field is distributed across the propagation terrain and exhibits fixed phase points defined by the length of its wavelength. For example, say a transmitter emits a continuous wave signal of: 1600 kHz. This signal would have a wavelength that exhibits the same phase point or marker on the wave every 187.5 meters, the wavelength of the signal. If the antenna on the mobile receiver moves along the path of propagation of the transmitted signal for 187.5 meters, the mobile receiver will experience a 360° phase transition of its received signal. Also, any oscillators used in the mobile receiver which are not responsive to the phase of this 360° phase transition will appear to be fixed in phase. The product or sum derived from the interaction between this fixed oscillator(s) and this 360° phase transition of the received signal will exhibit the 360° phase transition as well.

The receiver of the present invention uses these novel approaches to produce very high integrity distance measurements. Since the measurement window of the present invention is generated by the same source signal (that is, the received signal f), drift between clocks present in conventional approaches is eliminated. Further, since the electronics for the receiver of the present invention are responsive to the phase of the received signal f, the loss of signal f due to propagation changes, electrical disturbances, and the like will not effect the receiver of the present invention ability to display high integrity distance measurements when those conditions are improved. Since the receiver of the present invention does not need a high integrity signal source such as an atomic clock, the system of the present invention is one to two orders of magnitude less expensive for the consumer than receivers having such signal sources.

The single signal f is supplied to a receiver stage 22 by an antenna 20. The output f of receiver stage 22 is supplied as an input of first mixer 26. The local oscillator 24 generates a local oscillator signal $f_1$, which is mixed with signal f in mixer 26 to produce an IF signal $f-f_1$. This IF signal $f-f_1$ is supplied to an IF amplifier stage 28, which amplifies it by an selected amount. The IF signal $f-f_1$ (which is also the second component) is supplied to the second mixer 30, which mixes it with the signal $f_1$ from local oscillator 24. The output of mixer 30 is signal f.

Returning again to the example, at the point where the receiver has traversed a complete 360° phase transition of the transmitted signal f, this 360° phase transition appears at two points representing two frequencies in the receiver. In the first mixer 26, the signal is represented by the result of the 800 KHz local oscillator signal $f_1$ being subtracted from its former f value of 1600 KHz. This subtraction then produces an 800 KHz signal $f-f_1$ which has undergone a 360° phase transition. This 800 KHz signal $f-f_1$ is processed by the intermediate frequency system 28 and then introduced to the second mixer 30, where the 800 KHz local oscillator signal $f_1$ is added out, returning the signal f to its former phase and frequency value of 1600 kHz. Note that second mixer 30 is enclosed in radio frequency shielding (indicated by the dashed lines) with an integrity of 100 decibels (dB).

The signal f of 1600 KHz is now introduced to the linear doubler or linear expansion amplifier 32, where it will be cancelled and a 3200 kHz signal 2f will be produced that will retain the phase information of 1600 kHz signal f. Note that this 3200 KHz signal 2f will have undergone two 360° phase transitions, representing the 360° phase transition of the original received signal f. A preferred form for the linear doubler is the linear expansion amplifier disclosed in U.S. Pat. No. 3,681,705 to Spence, which is incorporated by reference herein.

This 3200 kHz signal 2f is now introduced to the first phased lock loop mixer 34, where its mixing frequency 2f' is selected to be 3199. kHz. The resultant 1 KHz signal $2f'-2f$ is compared in a comparator 38 to a time base signal 2f'/n of 1. KHz, which signal 2f'/n is responsive to the phase of the 3199 KHz signal 2f'. This 3199 KHz signal signal 2f' has also experienced two 360° phase transitions since its frequency is responsive to the phase of the 3200 kHz signal 2f.

Since the 1. kHz time base is used, the time base 2f'/n has progressed 0.0000003125 second or 2/3199 of its total time base.

We now return to the 800 kHz signal $f-f_1$ (the second component). The second phase loop 41 is made up of mixer 42, oscillator 44, divider 48 and comparator 46. The second phase lock loop 41 functions in a manner similar to that of the first loop 39: the frequency of signal K locks up to the phase of signal $f-f_1$.

Since the 1. kHz k/m derived from this phase lock loop 41 is from the 800 kHz signal $f-f_1$, and since it has undergone only one 360° phase transition, its time base has moved only one increment of the 799 division m associated with the 800 KHz signal $f-f_1$. This second phase lock loop 41 time base has progressed 1/799 of its total value or 0.0000012515 seconds.

We now have the measurement window of the present invention. The beginning of the measurement window is the time base of the first phase lock loop system 39 time base, which has progressed 0.0000003125 sec. along a 1 millisecond window. The ending of the measurement window is defined by the second phase lock loop 41, where the time base has progressed 0.0000012515 seconds. Substracting the beginning of the measurement window from the ending produces the following time interval:

| |
|---|
| .0000012515 seconds |
| .0000003125 seconds |
| .000000939 seconds |

Obviously, the 0.000000939 seconds of the measurement window in the example represents 187.5 meters movement of the receiver of the present invention relative to the transmiter. The total measurement window in the example will be 1 milliseconds, since a time base of 1 kHz has been used. This signal measurement window (using a 1 kHz time base) is representative of 300,000 meters in distance from the calibration point.

An explanation of how the full millisecond measurement window is generated is now presented. When the receiver antenna 20 has progressed 799 transitions along the propagation path (in other words, 799 wavelengths of signal f), the second phase lock loop 41 will have experienced its total division capability m; in other words, the time base product 1 kHz divided therefrom will have traveled 1. ms. At the same time, the first phase lock loop 39 being responsive to twice the 799 received transitions will have progressed only 1598 transitions of the total n of 3199. In other words, it has progressed along its time base only 0.5 milliseconds. Since both time bases are progressing in the same direction at different velocities, another 799 transitions of the first phase lock loop 39 are required to complete the 1. ms total measurement window.

Turning now to the increment count generator that is phase locked to a signal from the oscillator 40 of the second phase locked loop 41, its frequency has been selected to be 300 mHz. Consequently, since the total measurement window is 300 km, the phase comparator 50 will read directly in meters; similarly, a frequency of 30 mHz would represent 10 meters per increment in the measure window.

We now turn to the elimination of phase errors introduced by the local oscillator 24. Recall that in the preferred mathematical example, signal f is 1600 kHz and signal $f_1$ is 800 kHz. Should the local oscillator 24 move up 1. Hz from the desired frequency, the value of signal $f_1$ would become 800,001 Hz. This change would produce an intermediate frequency $f-f_1$ of 799,999 Hz. Note, however, that this 799,999 Hz signal $f-f_1$ is supplied to the second mixer 30 where it is added to the abnormal 800,001 Hz signal $f_1$, producing a signal f of the desired 1600 kHz. Thus, with respect to the first component signal f, the phase ambiguity introduced by oscillator 24 has been cancelled out.

Returning to the second phase loop 41, lets look at what happens to the second component having an abnormal frequency of 799,999 Hz. We will also take into account the example where the time base for the first phase lock loop 39 is responsive to 799 transitions, or 0.5 milliseconds. These 799 transitions have moved the phase loop 41 by an amount of 1 milliseconds, thus creating a measurement window of 0.5 milliseconds, which is indicative of the distance that the receiver traveled with respect to the transmitter. Since the frequency generated by generator 52 is directly proportional to the frequency k of oscillator 44, the increase in the frequency of he second component $f-f_1$ will cause the value of k to increase, causing a proportional decrease in the size of the measurement window. Thus, the phase error is cancelled out. This results in a very precise determination of the position of the receiver with respect to the transmitter.

It should be understood that in a practical application, a designer would not select a value of signal $f_1$ which is ½ the value of signal f. It is understood that the present invention encompasses other values for the frequencies uses, and that the example shown is only for purposes of illustration.

The present invention should only be limited by the following claims.

What is claimed is:

1. A distance measuring receiver adapted to receive a single carrier from a remote transmitter comprising:
   (a) front end means for producing an intermediate frequency signal in accordance with the received single carrier signal;
   (b) first component means, connected to said front end means, for producing in accordance with said intermediate frequency signal a signal $2f'/n$ indicative of the summation of n cycles of a first component for defining the start of a measurement window;
   wherein said first component means comprises:
   (1) frequency multiplier means for frequency translating said intermediate frequency signal to a first component;
   (2) loop means connected to said frequency multiplier means for producing said $2f'/n$ signal by summing n cycles of said first component;
   (c) second component means, connected to said front end means, for producing in accordance with said intermediate frequency signal a signal k/m indicative of the summation of m cycles of a second component for defining the stop of said measurement window; and
   (d) indicator means, connected to said first component means and said second component means, for producing a measurement window defined by said start and said stop, said measurement window providing a real time indication of the distance of the receiver from the transmitter.

2. The receiver of claim 1, wherein said frequency multiplier means comprises mixer means for frequency translating said intermediate frequency signal to a signal f having the same frequency f as said received carrier signal.

3. The receiver of claim 2, wherein said frequency multiplier further comprises linear frequency doubler means for frequency translating said signal f to said first component of frequency 2f.

4. The receiver of claim 3, wherein said linear frequency doubler means comprises linear expansion amplifier means.

5. The receiver of claim 1, wherein said loop means comprises:
   (a) local oscillator means for generating a local oscillator signal $2f'$;
   (b) loop mixer means, connected to said frequency multiplier means and said local oscillator means for mixing said first component with said local oscillator signal $2f'$ to produce a difference signal $2f'-2f$;
   (c) loop divider means, connected to said local oscillator means to divide said local oscillator signal $2f'$ by an amount n to produce said $2f'/n$ signal; and
   (d) comparator means, connected to said loop mixer means and said loop divider means, for comparing said $2f'/n$ signal with said difference signal $2f'-2f$ to produce a control signal used to control the frequency $2f'$ of said local oscillator means.

6. The receiver of claim 5, wherein said local oscillator means is a voltage controlled oscillator.

7. The receiver of claim 6, wherein said local oscillator means is a voltage crystal controlled oscillator.

8. A distance measuring receiver adapted to receive a single carrier from a remote transmitter comprising:
   (a) front end means for producing an intermediate frequency signal in accordance with the received single carrier signal;
   (b) first component means, connected to said front end means, for producing in accordance with said intermediate frequency signal a signal $2f'/n$ indicative of the summation of n cycles of a first component for defining the start of a measurement window;
   (c) second component means, connected to said front end means, for producing in accordance with said intermediate frequency signal a signal k/m indicative of the summation of m cycles of a second component for defining the stop of said measurement window; and
   wherein said second component means comprises:
   (1) local oscillator means for generating a local oscillator signal k;
   (2) loop mixer means, connected to said front end means, for mixing said intermediate signal with said local oscillator signal k to produce a difference signal $f-f_1-k$; and
   (3) loop divider means, connected to said loop mixer means and said loop divider means, for comparing said k/m signal with said difference signal $f-f_1-k$ to produce a control signal used to control the frequency k of said local oscillator means; and
   (d) indicator means, connected to said first component means and said second component means, for producing a measurement window defined by said start and said stop, said measurement window providing a real time indication of the distance of the receiver from the transmitter.

9. The receiver of claim 8, wherein said local oscillator means is a voltage controlled oscillator.

10. The receiver of claim 8, wherein said local oscillator means is a voltage crystal controlled oscillator.

11. A distance measuring receiver adapted to receive a single carrier signal from a remote transmitter comprising:
(a) first mixer means adapted to frequency translate the received single carrier signal to an intermediate frequency $f-f_1$;
(b) first component means comprising:
(1) second mixer means connected to said first mixer means for frequency translating said intermediate frequency $f-f_1$ to a signal f having the same frequency as said received signal carrier signal;
(2) linear frequency doubler means, connected to said second mixer means, for frequency doubling said signal f to produce a signal 2f; and
(3) first loop means, connected to said linear frequency doubler means, for producing in accordance with said signal 2f a signal 2f'/n indicative of the summation of n cycles of a first component for defining the start of a measurement window;
(c) second component means comprising:
(1) second loop means, connected to said first mixer means, for producing in accordance with said signal $f-f_1$ a signal k/m indicative of the summation of m cycles of a second component for defining the stop of said measurement window; and
(d) indicator means comprising:
(1) phase comparator and display means, connected to said first component means and said second component means, for displaying a measurement window defined by said start and said stop, said measurement window providing a real time indication of the distance of the receiver from the transmitter, and
(2) count generator means, connected to said second component means and said phase comparator and display means, for defining the measurement increments of said measurement window.

12. The receiver as in claim 11, wherein said linear frequency doubler means is a linear expansion amplifier means.

13. A method for determining in real time the distance of a receiver from a transmitter comprising the steps of;
(1) transmitting from the transmitter a single carrier signal;
(2) receiving at said receiver said single carrier signal to produce an intermediate frequency signal $f-f_1$;
(3) frequency translating said intermediate frequency signal $f-f_1$ to a signal 2f;
(4) producing a signal 2f'/n from said signal 2f, said signal 2f'/n being indicative of the summation of n cycles of said signal 2f, said 2f'/n defining the start of a measurement window;
(5) producing a signal k/m from said intermediate signal $f-f_1$, said signal k/m being indicative of the summation of m cycles of the intermediate signal $f-f_1$, said signal k/m defining the stop of said measurement window;
(6) producing a measurement window defined by said start and said stop which is a real time indication of the distance of said receiver from said transmitter; and
(7) defining said measurement increments of said measurement window.

* * * * *